United States Patent
Azima et al.

(10) Patent No.: US 6,215,881 B1
(45) Date of Patent: Apr. 10, 2001

(54) CEILING TILE LOUDSPEAKER

(75) Inventors: Henry Azima, Cambridge; Martin Colloms, London; Neil John Harris, Cambridge, all of (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/029,334

(22) PCT Filed: Sep. 2, 1996

(86) PCT No.: PCT/GB96/02153

§ 371 Date: Jul. 27, 1999

§ 102(e) Date: Jul. 27, 1999

(87) PCT Pub. No.: WO97/09843

PCT Pub. Date: Mar. 13, 1997

Related U.S. Application Data

(63) Continuation-in-part of application No. 08/707,012, filed on Sep. 3, 1996.

(30) Foreign Application Priority Data

| Sep. 2, 1995 | (GB) | 9517918 |
| Oct. 31, 1995 | (GB) | 9522281 |
| Mar. 30, 1996 | (GB) | 9606836 |

(51) Int. Cl.[7] .................................................. H04R 25/00
(52) U.S. Cl. ........................ 381/152; 381/426; 181/167
(58) Field of Search .................................... 381/425, 423, 381/431, 152, 426; 181/167, 148, 162, 161

(56) References Cited

U.S. PATENT DOCUMENTS

| 3,247,925 | * | 4/1966 | Warnaka | 381/398 |
| 3,347,335 | * | 10/1967 | Watters et al. . | |
| 3,509,290 | * | 4/1970 | Mochida et al. . | |
| 3,553,392 | * | 1/1971 | Liebscher | 381/152 |
| 3,570,626 | * | 3/1971 | Mochida et al. . | |
| 3,597,962 | * | 8/1971 | Holtz . | |
| 3,686,927 | * | 8/1972 | Scharton . | |
| 4,198,550 | * | 4/1980 | Matsuda et al. | 381/354 |
| 4,300,655 | * | 11/1981 | Sakamoto et al. . | |
| 4,392,027 | * | 7/1983 | Bock | 381/152 |
| 4,426,556 | * | 1/1984 | Saiki et al. . | |
| 4,506,117 | * | 3/1985 | Fresard | 381/162 |
| 4,829,581 | * | 5/1989 | Nieuwendijk et al. . | |
| 4,899,390 | * | 2/1990 | Takewa et al. . | |
| 5,025,474 | * | 6/1991 | Tanaka et al. . | |
| 5,073,946 | * | 12/1991 | Satoh et al. . | |
| 5,425,107 | | 6/1995 | Bertagni et al. . | |
| 6,058,196 | * | 5/2000 | Heron . | |
| 6,097,829 | * | 7/2000 | Guenther et al. . | |

FOREIGN PATENT DOCUMENTS

WO 95/14296    5/1995   (WO) .

* cited by examiner

*Primary Examiner*—Curtis A. Kuntz
*Assistant Examiner*—P. Dabney
(74) *Attorney, Agent, or Firm*—Foley & Lardner

(57) ABSTRACT

A ceiling tile adapted to be supported in an overhead opening and function as a loudspeaker. The tile is in the form of a distributed mode acoustic radiator with a transducer mounted wholly and exclusively on the radiator at a location for coupling to resonant bending wave modes so as to vibrate the radiator and cause it to resonate.

11 Claims, 3 Drawing Sheets

CEILING TILE LOUDSPEAKER

This application is a continuation-in-part of application Ser. No. 08/707,012, filed Sep. 3, 1996.

DESCRIPTION

1. Technical Field

The invention relates to loudspeakers and more particularly to loudspeakers comprising panel-form acoustic radiating elements.

2. Background Art

It is known from GB-A-2262861 to suggest a panel-form loudspeaker comprising:

resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a working frequency band for the loudspeaker.

There is a wide application for sound distribution using speakers in standard module form, interchangeable with commercial ceiling tiles, generally on a 600×600 mm format, the objective being the even distribution of articulate speech and music over a large area. Some conventional moving coil drivers and panel derivatives are presently made for this application.

Existing technology uses cone type moving coil speakers fitted into frames and acoustic baffles. While commonly used due to moderate cost and ready availability, these suffer from serious hot spot (excessive sound intensity) and directional effects and consequently poorer intelligibility off axis. Many units are required to give a uniform coverage over larger area.

Another known development uses a cone type speaker where the 'cone' is a polystyrene structure with a flat front surface, which may be painted. Here a combination of additional moving coil drivers fitted to their diaphragm, the latter structured to shrink acoustically with increasing frequency, may give a wider radiation pattern than a conventional cone speaker. These polystyrene foam speaker units require chassis and acoustic baffles for mounting them in position.

DISCLOSURE OF INVENTION

Embodiments of the present invention use members of nature, structure and configuration achievable generally and/or specifically by implementing teachings of our patent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in U.S. Pat. application No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers the purpose of use in a suspended ceiling tile.

Members as above are herein called distributed mode radiators and are intended to be characterised as in the said parent application and/or otherwise as specifically provided herein.

The invention is a ceiling tile for a ceiling and incorporating a loudspeaker, characterised in that the tile is in the form of a distributed mode acoustic radiator, and by a transducer mounted wholly and exclusively on the radiator to vibrate the radiator to cause it to resonate. A resilient suspension may be disposed at the periphery of the radiator and by which the radiator is supported in the suspended ceiling.

The radiator may be a stiff lightweight panel comprising a cellular core sandwiched by high modulus skins.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
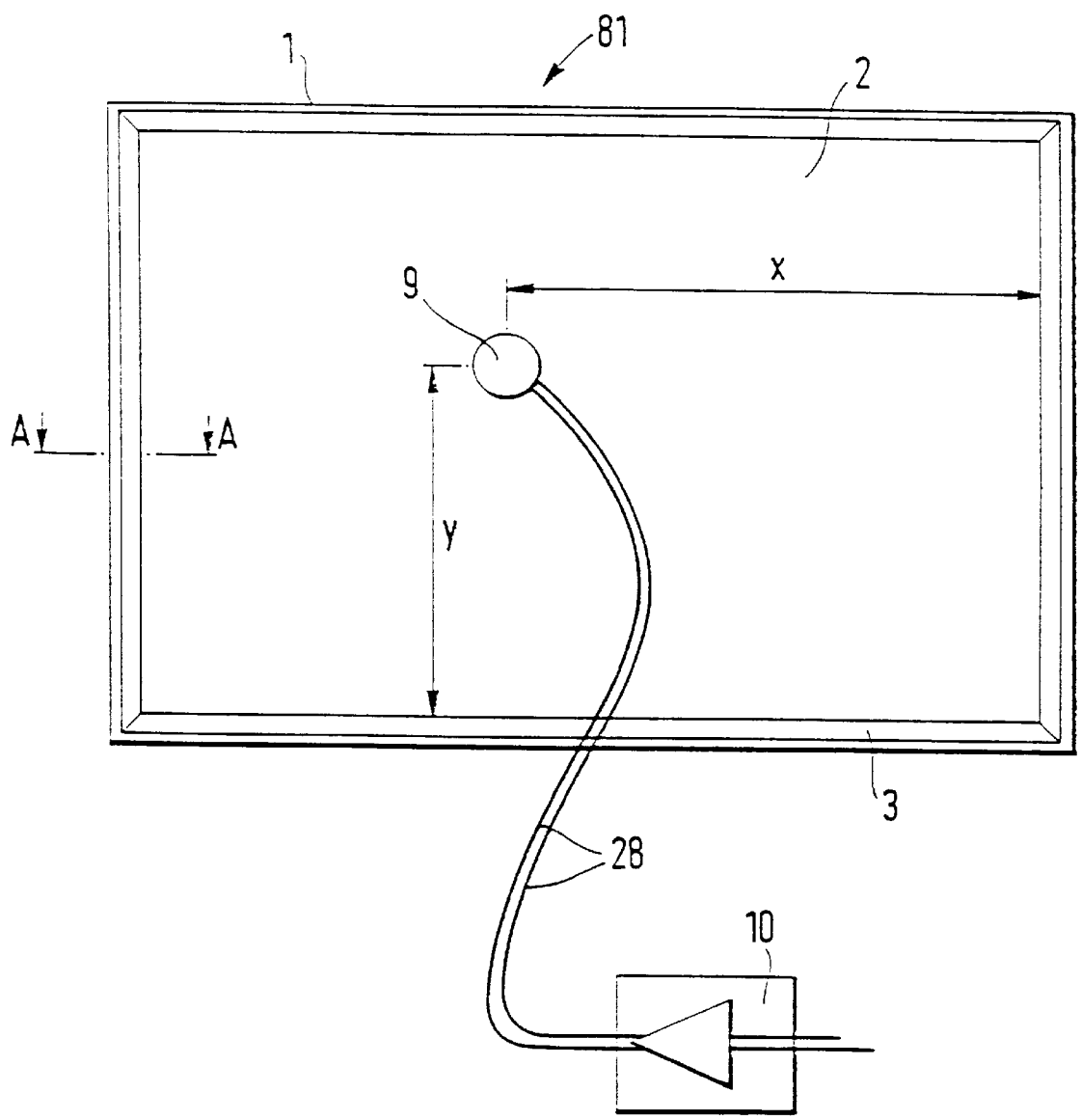
FIG. 1 is a diagram showing a distributed-mode loudspeaker as described and claimed in our parent application No. 08/707,012.

Referring to FIG. 1 of the drawings, there is shown a panel-form loudspeaker (81) of the kind described and claimed in our co-pending International application No. (our case P.5711) of even date herewith comprising a rectangular frame (1) carrying a resilient suspension (3) round its inner periphery which supports a distributed mode sound radiating panel (2). A transducer (9) e.g as described in detail with reference to our parent application No. 08/707,012 of even date herewith, is mounted wholly and exclusively on or in the panel (2) at a predetermined location defined by dimensions x and y, the position of which location is calculated as described in our co-pending International application No. (our case P.5711) of even date herewith, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of transducer and thus improve power handling.

Figure 2A:
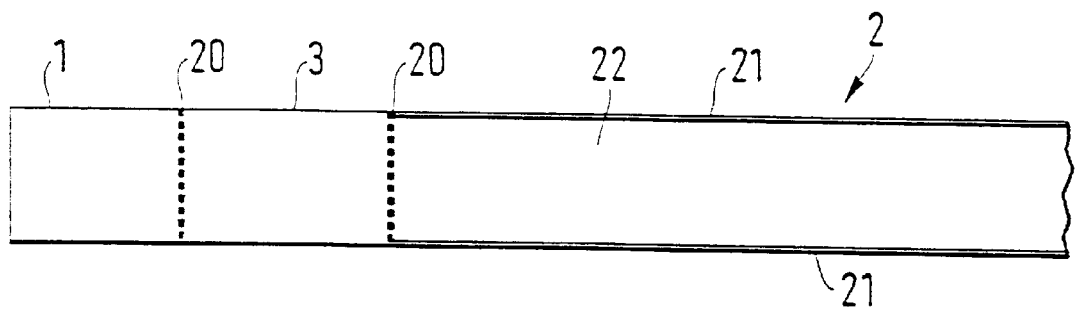
FIG. 2a is a partial section on the line A—A of FIG. 1.
Figure 2B:
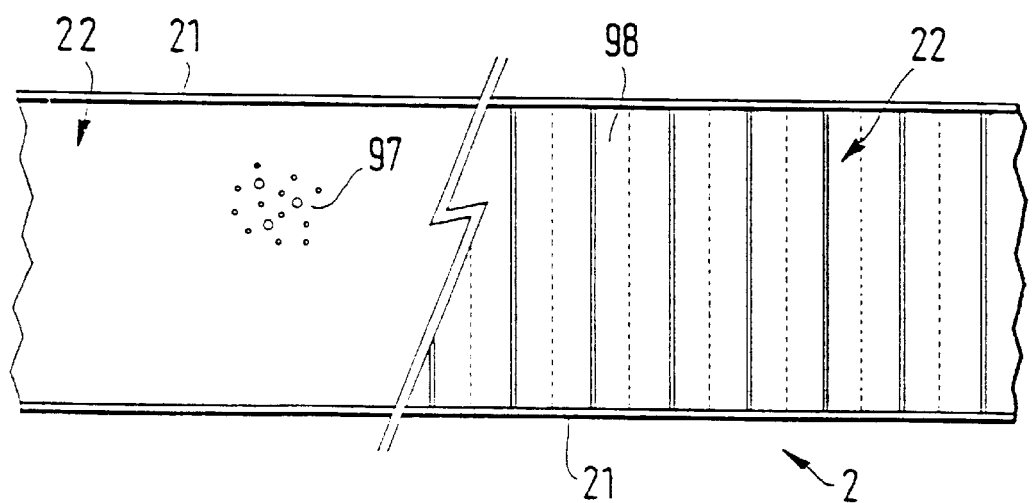
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate eLc. adhesives.

FIG. 2b illustrates, to an enlarged scale, that the panel (2) is a rigid lightweight panel having a core (22) e.g. of a rigid Dlastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Revlar (RTM), Nomex (RTM), plain or bonded papers, and various synthetic plastics films, as well as expanded or foamed plastics or pulp materials, even aerogel metals if of suitably low density. Some suitable core layer materials effectively exhibit self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnet fields. Conventional speakers have a large magnetic field, up to 1 meter distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/ right geometry with respect to the listener provides a further angular component. Good stereo is thus obtainable.

There is a further advantage for a group of listeners compared with conventional speaker reproduction. The ntrinsically dispersed nature of acoustic panel sound adiation gives it a sound volume which does not obey the inverse square law for distance for an equivalent point source.

Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3A:
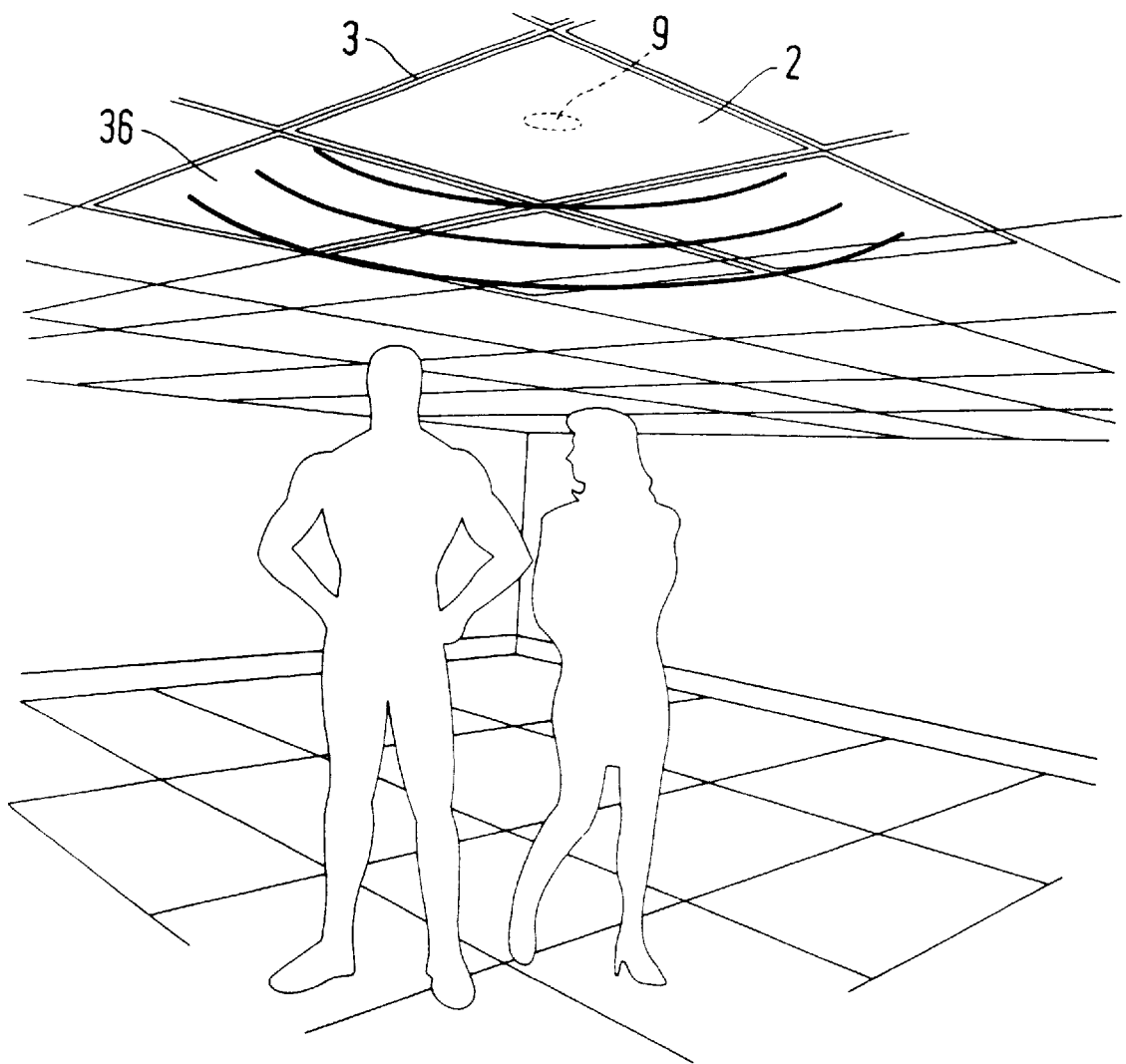
FIG. 3a is a perspective diagram of a room incorporating a suspended ceiling.
Figure 3B:
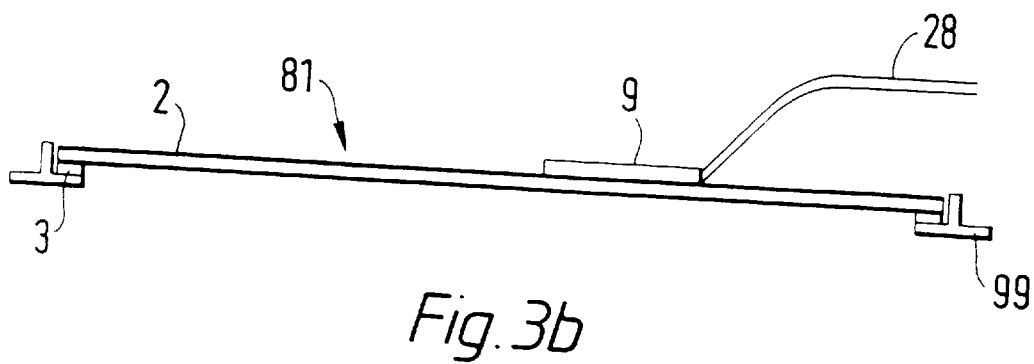
FIG. 3b is a cross-sectioned side view of an embodiment of distributed-mode loudspeaker according to the present invention in the form of a ceiling tile.

FIG. 3 illustrates a ceiling tile (36) of the kind adapted to be supported in a grid-like suspended frame (99) to form a suspended ceiling, and which is formed as a loudspeaker (81) of the kind shown in FIGS. 1 and 2, that is to say comprising a stiff, lightweight multi-mode resonating panel (2) having a core (22) enclosed by skins (21) on both sides. The panel (2) is mounted at its periphery on a resilient suspension (3) of foam rubber which is supported on the frame (99). The suspension (3) may be attached to either the panel (2) or to the frame (99) by means of an adhesive, but the connection may be by ravity alone. The panel (2) carries a transducer (9), e.g. of the kind shown in FIGS. 7 to 12, to launch bending waves into the panel to cause it to resonate to produce an acoustic output. The transducer (9) may be positioned on the panel as described in our co-pending International No. (our file P.5711).

In a preferred example of good quality the acoustic panel is made as an expanded polystyrene foam core of typically 100 g/m3 density, 8 mm thick, skinned with hardened aluminium alloy skins of 0.1 mm. A soft foam or felt strip, some 3 mm thick is fixed to the perimeter to provide a partially compliant mounting when placed in the ceiling frames and also helps to suppress any possible vibration in the ceiling framing sections.

A preferred form of excitations is a unitary moving coil inertial transducer with a 25 mm or 38 mm voice coil, 6 ohms impedance, 40 watt power handling, with the coil bonded directly to the panel surface. A compact cup type magnet system enclosed and self sealing may also be bonded directly to the panel via a resilient decoupling ring chosen for its vibro-mechanical properties and dimensional stability.

Depending on application, a low cost form ceiling tile can be made with a plastics foam cored paper faced board material, which may have a light alloy foil layer for fire retardancy, driven by low cost piezo vibration exciters. Reduced maximum sound levels are obtained, still more than sufficient for personnel announcements, voice overs and background music distribution. The wide area coverage is maintained.

When metallic or carbon conductive skins or cores are employed the speaker may be earth bonded or grounded to maintain EMC screening of an installed structure.

INDUSTRIAL APPLICABILITY

A ceiling tile loudspeaker according to the present invention does not require a frame, chassis, or acoustic baffle. The entire speaker panel is unitary and may be placed in position just like a passive decorative ceiling tile. The acoustic panel is relatively lightweight, reducing ceiling loadings and aiding installation. It may readily be made fire resistant. It can be decorated, painted or papered to render it invisible in a ceiling installation without significant acoustic impairment.

Minor damage does not impair the performance as compared with the diaphragms of cone type speakers which are very fragile. Also important is the great advantage in sound distribution given by the acoustic panel speaker. Its combination of high intelligibility and wide angle coverage means that in a typical large area installation superior acoustic performance may be achieved with around half the number of conventional installed loudspeakers, with a great saving in installed cost.

What is claimed is:

1. A ceiling tile adapted to be supported in an overhead opening, comprising:

a member having slected values of certain physical parameters which enable the member to sustain and propagate ainput vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high; and a transducer mounted wholly and exclusively on the member at one of said sites on the member, the transducer being capable of vibrating the member in the predetermined frequency range to couple to and excite the resonant bending wave modes in the member and cause the member to resonate and produce and acoustic output.

2. A ceiling tile according to claim 1, wherein the member comprises a cellular core sandwiched by high modulus skins.

3. A ceiling tile according to claim 2, wherein the cellular core is of foamed plastics.

4. A ceiling tile according to claim 1, further comprising a resilient suspension disposed at the periphery of the member and adapted to support the member in the opening.

5. A ceiling tile according to claim 4, wherein the transducer is an inertial vibration transducer.

6. A ceiling tile according to claim 4, wherein the member comprises a cellular core sandwiched by high modulus skins.

7. A ceiling tile according to claim 6, wherein the cellular core is of foamed plastics.

8. A ceiling tile according to claim 7, wherein the transducer is an inertial vibration transducer.

9. A ceiling tile according to claim 4, wherein the resilient suspension is adapted to support the member on a grid-like suspended ceiling frame.

10. A ceiling tile according to claim 1, wherein the transducer is an inertial vibration transducer.

11. A ceiling tile according to claim 1, wherein the resilient suspension is adapted to support the member on a grid-like suspended ceiling frame.

* * * * *